United States Patent [19]

Haase et al.

[11] Patent Number: 5,069,893

[45] Date of Patent: * Dec. 3, 1991

[54] POLYMERIC BASIC ALUMINUM SILICATE-SULPHATE

[75] Inventors: Dieter Haase, Ste-Catherine; Nelu Spiratos, La Prairie; Carmel Jolicoeur, Deauville, all of Canada

[73] Assignee: Handy Chemicals Limited, La Prairie, Canada

[*] Notice: The portion of the term of this patent subsequent to Oct. 31, 2006 has been disclaimed.

[21] Appl. No.: 444,792

[22] Filed: Dec. 1, 1989

Related U.S. Application Data

[63] Continuation-in-part of Ser. No. 266,854, Nov. 3, 1988, Pat. No. 4,981,675.

[51] Int. Cl.$^5$ .............. C01F 11/46; D21H 21/16; C02F 1/52; B01D 21/01
[52] U.S. Cl. .................... 423/556; 423/625; 423/629; 210/723; 210/928; 127/43; 162/181.1
[58] Field of Search ............. 423/556, 625, 629; 210/723, 910; 127/43; 162/181.1

[56] References Cited

U.S. PATENT DOCUMENTS

| | | | |
|---|---|---|---|
| 2,310,009 | 2/1943 | Baker et al. | 210/199 |
| 2,999,734 | 9/1961 | Weber et al. | 423/380 |
| 3,535,259 | 10/1970 | Horioka | 423/556 |
| 3,963,640 | 6/1976 | Smith | 210/716 |
| 4,024,087 | 5/1977 | Lainer et al. | 423/556 |
| 4,252,735 | 2/1981 | Layer et al. | 423/265 |
| 4,284,611 | 8/1982 | Gancy et al. | 423/556 |
| 4,536,384 | 8/1985 | Lindall | 423/556 |
| 4,563,342 | 1/1986 | Gunnarsson et al. | 423/556 |
| 4,566,986 | 1/1986 | Waldmann | 423/556 |
| 4,877,597 | 10/1989 | Haase | 423/556 |

FOREIGN PATENT DOCUMENTS 0110847 6/1984 European Pat. Off. .
2018129 10/1970 Fed. Rep. of Germany .

OTHER PUBLICATIONS

Patent Abstracts of Japan, *Process for Production of Soluble Basic Aluminum Salt*, (1976).
Soviet Inventions Illustrated, Abstract, (1984).

*Primary Examiner*—Gary P. Straub
*Attorney, Agent, or Firm*—Oblon, Spivak, McClelland, Maier & Neustadt

[57] ABSTRACT

A polynucleate aluminum hydroxy silicate-sulphate compound (PASS) having the following average composition:

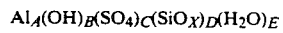

$$Al_4(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
X is greater than 2.0 but less than or equal to 4.0 such that $3 = B + 2C + 2D (X-2)$;
E is larger than 4 when the product is in aqueous form. The compound is useful for water treatment and other applications where an aluminum hydroxide gel system is required. The compound, in aqueous solution, has a long storage life.

18 Claims, No Drawings

POLYMERIC BASIC ALUMINUM SILICATE-SULPHATE

CROSS-REFERENCE TO RELATED APPLICATION

This application is a Continuation-in-part of our copending application Ser. No. 266,854 filed on Nov. 3, 1988, now U.S. Pat. No. 4,981,675.

BACKGROUND OF THE INVENTION

I. Field of the Invention

The present invention relates to novel polymeric basic aluminum silicate-sulphates (PASS) and to a process for their preparation. These products are useful in industries such as: water treatment, pulp and paper, or wherever an aluminum hydroxide gel system resulting from such a polymer can be employed.

II. Description of the Prior Art

Various aluminum containing compounds are used as precipitating agents in sewage treatment plants. One of the most widely used chemicals for the treatment of water is aluminum sulphate, widely known in the trade (perhaps erroneously) as Alum. These compounds are specifically used as flocculating and coagulating agents in water purification treatment. Although Alum has been extensively used, it presents several drawbacks namely its poor performances at low temperature, its high alkalinity requirements and potentially high residual soluble aluminum compounds.

The recent development of basic poly aluminum sulphate has provided products which overcome most of the difficulties mentioned for aluminum sulfate. However, a major problem associated with the use of basic polyaluminum sulphate is the stability of the solutions. The difficulty is that aqueous solutions of basic polyaluminum sulphate tend to form a precipitate of metal salts or become cloudy or partly gelatinous after only a short period of time. When this occurs, these solutions can often no longer be used or are less effective in most applications. Therefore, unless they are stabilized in some manner, basic polyaluminum sulphate solutions must be used within a very short time of their preparation. This is clearly a serious disadvantage because most industries require chemicals which are stable over a long period of time so that they can be stored in reasonable quantities and used as and when desired.

The traditional methods of preparation of polyaluminum sulphate solutions usually follow a partial neutralization of aluminum sulphate with hydroxyl groups from lime, causticsoda, soda ash, ammonium hydroxide or other alkali sources to a pH of approximately 3.5–4.3, typically 3.8, since aluminum hydroxide is not precipitated below a 3.8 pH.

Stabilizers such as phosphates or chlorides may also be added to partially replace sulphate groups, or alternatively organic complexing agents such as sodium heptonate, citric acid, sorbitol, sodium citrate, sodium tartrate, sodium gluconate and the like may be added separately to stabilize the aqueous aluminum salt. The stabilization and neutralization techniques are exemplified in Canadian Patents 1,123,306, 1,203,364, 1,203,664 and 1,203,665, as well as in U.S. Pat. Nos. 4,284,611 and 4,536,384.

One will usually encounter an important by-product loss when using the processes described in the prior art. Compounds such as calcium or sodium sulphate and ammonium sulphate in concentrations that will range from 20 to 30% by weight will typically be produced as by-products. The exact percentage of loss will depend on the basicity of the solution produced and on the source of alkali used. Also, mixing and possible filtration problems occur when lime is used as the alkali. Finally, possible crystallization problems may occur when sodium sulphate is formed as a by-product.

Another method of producing a complex alkali metal aluminum silicate material completely soluble in hydrochloric acid is disclosed in UK 1,399,598 published on 2 July 1975. While this method also uses high shear mixing, the process and product are different from the present invention in that only two ingredients, basic sodium silicate and an acidic aluminum salt are mixed (page 1, lines 59 to 62) at high dilution (page 2, lines 35 to 37) to produce a stable dispersion and not a solution (page 2, lines 82 to 84) which is preferably made just prior to injection of the product into the water to be treated (page 3, lines 97 to 107).

One of the most important problems encountered in the storage of an aluminum based product such as poly aluminum sulphate is the precipitation of substantial amounts of aluminum hydroxide within 2 to 30 days following the preparation of the desired product, whether it is stabilized or not. Although the rate of hydrolysis leading to the precipitation of aluminum hydroxide will vary depending on the method and temperature of preparation as well as the choice of the stabilizer, it is in most cases a major problem.

Therefore, it would be highly desirable to provide an aluminum based product useful as a water treating agent and storable for long periods of time without encountering major losses in efficiency.

SUMMARY OF THE INVENTION

In accordance with the present invention, there is provided a basic polynucleate aluminum hydroxy silicate-sulphate compound having an average composition (PASS):

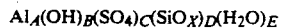

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
X is greater than 2.0 but less than or equal to 4.0 such that $3 = B + 2C + 2D(X-2)$; and
E is larger than 4 when the product is in aqueous form.

The basicity of aqueous forms of the compound generally range from 25–66%, more usually 40–60%.

Also within the scope of the present invention is a process for the preparation of the product (PASS) of the present invention. This process comprises reacting aluminum sulphate with an alkali metal silicate and a metal alkali aluminate in aqueous solution under high shear mixing conditions and recovering the desired product. Further, the invention includes the use of the product in a method of flocculating/coagulating/precipitating suspended or dissolved solids in an aqueous system.

DETAILED DESCRIPTION OF THE INVENTION

The process of the present invention yields a PASS product presenting enhanced stability properties as well as performances equal to aluminum sulphate when the water to be treated has a temperature close to room temperature and performances superseding aluminum sulphate when the temperature of the water to be treated is lower than or equal to 16° C.

Various embodiments of the present invention will become more apparent by referring to the following description.

In one form, the present invention relates to stabilized aqueous solutions of polymeric basic aluminum silicate sulphate. These solutions are typically useful as flocculating agents, fixing agents, dewatering agents and coagulant aids. The flocculation properties of the product of the present invention supersede aluminum sulphate when water having a temperature of 16° C. or less is treated and in most cases equal to aluminum sulphate when the temperature of the water is higher than 16° C.

It has been found that PASS is particularly suitable for dewatering plant material containing water and plant juices, e.g. sugar beet pulp which has had the sugar leached out with water. Conventionally, the remaining pulp is dewatered by pressing, dried and used for animal feed. In the past, aluminum sulphate has been sprayed onto the leached beet pulp prior to pressing to obtain a product containing lower amounts of water prior to the drying step. The PASS product of the present invention, when used in this way, can lead to an even drier pressed pulp and thus make the drying step shorter and/or more economical.

The product

The novel product (PASS) that is contemplated in the context of the present invention has the following average composition:

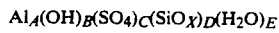

$$Al_A(OH)_B(SO_4)_C(SiO_X)_D(H_2O)_E$$

wherein
A is 1.0;
B ranges from 0.75 to 2.0, preferably 1.2–1.8;
C ranges from 0.30 to 1.12, preferably 0.53–0.90;
D ranges from 0.005 to 0.1, preferably 0.033–0.070;
X is greater than 2.0 but less than or equal to 4.0, preferably less than or equal to 3.0, such that $3 = B + 2C + 2D \ (X-2)$;
E is larger than 4 when the product is in aqueous form.

The distinguishing feature of the product of the present invention over other polymeric aluminum products prepared in the prior art is the presence of silicate species that are bonded to the polymer. These silicate species play an important role in the improved stability of the product over other existing poly aluminum sulphate compounds.

It should be noted that included in the scope of the present invention should be considered products to which minor or substantial additions, ranging from traces to 10 mol %, calculated on the basis of sulphate, of other anions such as phosphates, chlorides, acetates, borates, carbonates, or salts of organic or inorganic acids are present in the basic alum silicate complex.

Furthermore, the product may also contain minor or substantial amounts, ranging from traces to 10 molar %, calculated on the basis of Al, of such cations as iron, which may be contained in the alum when it is prepared from bauxite. Other cations which are included whether introduced unintentionally or otherwise, are magnesium, calcium, zinc, and zirconium. It remains, however, that the silicate species bonded into the poly aluminum sulphate species as described before is the product contemplated in the content of the present invention but the cations such as those mentioned above may also be included in the complex of the present invention.

The process

The product of the present invention is prepared in accordance with a one-step novel process in which aluminum sulphate, an alkali metal silicate and an alkali metal aluminate are reacted together in an aqueous solution under "high shear" mixing to yield the desired product. High shear mixing conditions are well known in the art. The fundamental definition of fluid shear rate is the velocity gradient, dv/dy which has units of reciprocal time $(ft/(sec)(ft) = sec^{-1})$. See J. Y. Oldshue, Fluid Mixing Technology, pub. McGraw-Hill, Publications Co., page 24 (1983). Standard high shear mixing conditions may be obtained using a Waring blender which achieves a velocity gradient exceeding 1000 $sec^{-1}$. (See, for example, T. R. Camp, Floc Volume Concentration, Jour. AWWA, 68:656-673 (1968)). Mixing conditions characterized by a velocity gradient exceeding 1000 $sec^{-1}$ are, therefore, known in the art as high shear mixing conditions. While velocity gradients as low as 1000 $sec^{-1}$ may be used at lower than ambient temperatures, it is preferred to use velocity gradients of 3000 $sec^{-1}$ or higher, because at these velocities it is easier to maintain the speed of the mixer or homogenizer.

It has been found that the high shear mixing is an essential part of the process. While not wishing to be bound by any particular theory, it is proposed that high shear mixing provides two important functions. First, it gives instantaneous high dilution of the reactants, especially the alkali metal aluminate solution, as it is injected into the other reactants. This is required to avoid local excess concentrations of the alkali aluminate, since even small local excess concentrations relative to the aluminum will result in the formation and appearance of solid gel particles. Second, the high shear mixing provides the forces needed to disintegrate any small particles of gel into a highly dispersed, and non agglomerated form.

In practice, the high shear mixing is preferably sufficient to produce a reactive gel and to produce a substantially transparent basic poly aluminum silicate sulphate solution.

a. The starting materials

As mentioned above, the basic starting materials required are aluminum sulphate, an alkali metal silicate as well as an alkali metal aluminate. With regard to the alkali metal silicate, the use of any suitable alkali metal silicate may be contemplated, although the use of sodium silicate is preferred in the context of the present invention. With regard to the source of alkali metal aluminate, again, any suitable source of alkali metal aluminate can be foreseen although sodium aluminate appears to be the preferred product. In the preferred embodiment of this invention, a stabilized solution of alkali metal aluminate, specifically sodium aluminate, made according to the patent of Layer and Khan, U.S. Pat. No. 4,252,735 or their equivalents assigned to the same assignees as the present invention, is advantageously used. According to this patent, stabilized alkali metal aluminate is preferably made by dissolving hydrated alumina and alkali metal hydroxides in an aqueous medium in an amount sufficient to produce an aqueous solution containing at least 30% by weight of dissolved solids. The dissolved solids are then reacted, usually in the presence of a catalyst, with at least 0.02% by weight of an oligomeric or monomeric surfactant containing groups capable of bonding chemically to the aluminate thus produced. By using this preparation, stabilized by the incorporation of a water soluble surfactant into the aluminate, the shelf life of the product is increased.

As for the concentrations of the various starting materials, the aluminum sulphate solution should desirably be present in concentrations varying between 5600 to 8800 (preferably 5666 to 8719) parts by weight and the concentration of sodium silicate solution will normally vary between 15 and 400 (preferably 17 and 355) while the concentration of sodium aluminate solution could range between 600 to 1800 (preferably 639 to 1704) parts wherein the aluminum sulphate solution contains the equivalent of 28% $Al_2(SO_4)_3$, the sodium silicate contains the equivalent of 28.7% $SiO_2$ and the sodium aluminate contains the equivalent of 24.0% $Al_2O_3$ as well as 6% free NaOH. These concentrations are those of the usually available commercially sold preparations of these chemicals. It should be understood, however, that other concentrations can be successfully used, by making the necessary adjustments to the amount of water used in making the dilutions.

b. The reaction conditions

The products of the present invention are made under high shear mixing in order to achieve a high equivalent $Al_2O_3$ content and a clear final product in a simple and convenient one-step process.

In a preferred embodiment, from 100 to 300 (preferably 118 to 236) parts of a liquid sodium silicate, contained in from 900 to 2000 (preferably 983 to 1967) parts of additional water, are added to from 6100 to 7700 (preferably 6154 to 7620) parts of aluminum sulphate solution wherein sodium silicate before dilution contains the equivalents 28.7% $SiO_2$ and an $SiO_2$ to $Na_2O$ ratio of 3.22:1.0 and aluminum sulphate solution contains the equivalent of 28% $Al_2(SO_4)_3$. The mixture is then cooled to a temperature ranging from 10° to 20° C. and under high shear mixing producing a velocity gradient exceeding 1000 sec$^{-1}$, from 1000 to 1600 (preferably 1022 to 1534) parts of sodium aluminate contained in from 1200 to 1900 (preferably 1244 to 1867) parts of additional water may be slowly added over a period of time ranging from ¼ to ¾ hr. The sodium aluminate preferably contains the equivalent of about 24.0% $Al_2O_3$ before dilution. The resulting mixture may then be held at a temperature ranging from 10° to 20° C. for a period of time ranging from ¼ to ¾ hr. The preparation is held at a temperature between ambient and a maximum of 90° C. until it becomes clear. There is a time - temperature relationship involved in this reaction, which may be termed a digestion, to yield a clear solution. At lower digestion temperatures, longer digestion times are required to obtain a clear solution, while at higher digestion temperatures, a shorter digestion time is required. However, it has been discovered that the long term shelf life of the preparation is also affected by the digestion temperature, such that at higher digestion temperatures, the shelf life is shorter. After the mixture has become clear, the product can be cooled and stored until used.

The product obtained from this method is a clear or slightly turbid readily filtrable product. The use of high shear mixers or homogenizers enables the formation of the reactive, finely dispersed gel at high solids content and yields a final transparent liquid product containing as much as the equivalent of 7-10% $Al_2O_3$. These parameters are described in copending U.S. application Ser. No. 262,320 filed Oct. 25, 1988, Dieter Haase and Nelu Spiratos, inventors. With the silicate being incorporated into the polymer, one can expect a storage time of at least 3 months without any substantial loss of product stability. The storage temperature of the product should be in the range of 20° to 25° C., or preferably less for increased shelf life. Furthermore, the absence of silicate in the final product yields a solution that shows signs of aluminum hydroxide precipitation as early as 2-3 weeks after preparation. After 3 months, it shows large amounts of precipitation indicating substantial losses of the active aluminum containing ingredient from the liquid.

Another important advantage of the product of the present invention is the fact that it is more alkaline than Alum. As a result of this property, the treated water will demonstrate a higher alkalinity in every case. This considerable advantage reduces the need to effect final pH corrections of effluent drinking water, and may help to prevent corrosion of effluent pipes.

The present invention will be more readily illustrated by referring to the following Examples. It is by no means intended to limit the scope of protection by these Examples. In the following Examples, the dilution factors are illustrative only, and are not meant to be limiting.

EXAMPLE 1

Preparation of polymeric basic aluminum silicate-sulphate (PASS)

To a jacketed 1 liter flask were added 700 parts of liquid Alum containing the equivalent of 28% $Al_2(SO_4)_3$. Next were added 18.4 parts of sodium silicate containing the equivalent of 28.7% $SiO_2$ and $SiO_2$ to $Na_2O$ is 3.22:1.0 contained in 75 parts of additional water. The mixture was cooled to approximately 15° C. and under high shear mixing 129 parts of liquid sodium aluminate containing the equivalent of 24.0% $Al_2O_3$ contained in 157 parts water were slowly added over one half hour. The gel mixture was held at 15° C. for one half hour at which time the temperature was slowly increased to 65° over 2 hours. It was held for one and a half hour at 65° C. until the mixture became clear, and was then cooled.

When a 50% basic solution in which B=1.5, D=0.05 and X=2.311 is produced, it is supposed that the following reaction takes place:

$$1.25\ Al_2(SO_4)_3 + 0.062(Na_2O\cdot 3.22\ SiO_2) + 0.75\ Na_2Al_2O_4 + 3H_2O \rightarrow 4Al(OH)_{1.50}(SO_4)_{0.735}(SiO_{2.311})_{0.05} + 0.812\ Na_2SO_4$$

The physical and chemical characteristics of the final product are as follows:
Colour: colourless
Appearance: slightly turbid liquid
pH: 3.7
Specific gravity: 1.28
Equivalent $Al_2O_3$ concentration: 8.3% (a small increase over theoretical due to evaporation loss
Basicity: 50%
Sodium sulphate: 5.7%

EXAMPLE 2

The procedure of Example 1 was repeated using 24 parts of sodium silicate in 100 parts of water in order to obtain a final equivalent $Al_2O_3$ concentration of 7.5% and a value for D of 0.065.

The product obtained had the following physical and chemical characteristics:
Colour: colourless
Appearance: slightly turbid liquid
pH: 3.7
Specific gravity: 1.21
Equivalent $Al_2O_3$ concentration: 7.5%
Basicity: 50%
Sodium sulphate: 5.2%

EXAMPLE 3

This is an example of the industrial scale preparation of the product

To a 2,000 gal. U.S. stainless steel reactor with cooling jacket and a 120 rpm stirrer was added 5,377 kg of liquid Alum. The liquid was then cooled to 18° C., during which time, a mixture of 133 kg of sodium silicate (containing the equivalent of 28.7% $SiO_2$ and a $SiO_2:Na_2O$ ratio of 3.22:1.0) and 554 kg of water was prepared. This mixture was then added to Alum with mixing over a period of 15 minutes. The temperature increased from 18° to 19° C. with cooling water (17° C.) on continually. One half hour after the silicate addition, the mixture was recirculated from the bottom of the reactor into the top through a 3 inch piping, into which is connected a 6 inch Gifford-Wood Tandem Shear Homogenizer with maximum velocity gradient 199,200 $sec^{-1}$. This equipment is made by Greerco Corporation, Hudson, New Hampshire 03051, USA. A previously prepared mixture of 848 kg sodium aluminate (containing the equivalent of 24% $Al_2O_3$) and 1,032 kg water was then injected into the alum/silicate circulating in the 3 inch pipe approximately 6 inches before the homogenizer inlet. The total 1,880 kg of diluted sodium aluminate were added over a period of 1 hour, the temperature rising from 19° C. to 30° C. in spite of cooling. The homogenizer was then left circulating always with simultaneous in-tank mixing for an additional 1½ hours at 30° C. after which only the in-tank stirrer was used for a further one hour at 30° C. The yield was 100% (7,944 kg) and the product had the following physical and chemical characteristics.
Colour: colourless
Appearance: slightly turbid liquid
Turbidity: 38 N.T.U.
pH: 3.77
Specific gravity: 1.28
$Al_2O_3$: 8.1%
Basicity: 47.2%
Sodium sulphate: 5.2%

EXAMPLES 4 AND 5

To demonstrate that other cations and anions can be incorporated into the product These tests were done to demonstrate that iron can replace some of the aluminum and that chloride can replace some of the sulphate in the product without affecting the desirable flocculating properties of the product solution.

In Example 4, 5 molar % of the aluminum in the $Al_2(SO_4)_3$ was replaced by the equivalent amount of $Fe_2(SO_4)_3$. In Example 5, 5 molar % of the sulfate in $Al_2(SO_4)_3$ was replaced by an equivalent amount of chloride as $AlCl_3$. In both examples the product was prepared by mixing at a velocity gradient of 67,200 $sec^{-1}$ at 18°-19° C. After cooling, the solutions were heated to 62°-68° C. for one hour and cooled. The characteristics of these products are summarized and compared with those of Example 3, the PASS made of aluminum silicate sulphate, in the table below:

| DESCRIPTION | EXAMPLE 3 PASS | EXAMPLE 4 PASS MADE WITH 5 MOLAR % Fe INSTEAD OF Al | EXAMPLE 5 PASS MADE WITH 5 MOLAR % Cl INSTEAD OF $SO_4$ |
|---|---|---|---|
| Colour | Colourless | Red-brown | Colourless |
| Turbidity (NTU) | 38 | n/a | 45 |
| pH | 3.77 | 3.49 | 3.27 |
| Basicity % | 47.2 | 47.2 | 47.2 |
| Specific Gravity | 1.28 | 1.27 | 1.26 |

EXAMPLES 6 AND 7

To establish the minimum shear rate (velocity gradient) at which the product can be made Tests were carried out in the laboratory equipment to determine the minimum shear rate or velocity gradient at which the product of this process can be produced. It had been established by earlier experimentation that the minimum velocity gradient allowable was directly related to the temperature of the solution being mixed, the lower the temperatures, the lower the velocity gradient or shear rate that would produce a satisfactory gel.

The laboratory tests were carried out with a Gifford-Wood laboratory homogenizer, Model 1-L made by Greerco Corporation of Hudson, New Hampshire 03051, USA. According to the manufacturers' technical literature, this machine can be run at variable speeds, with the maximum of 7500 rpm. At 7500 rpm the peripheral velocity of the blades is 56 ft/sec, while the gap between the turbine blades and the concave surface of the stator is 0.01 inch. Thus at 7500 rpm the velocity gradient imparted is (peripheral speed of the blades ft/sec × 12 inches/ft)/0.01 inch gap = 67,200 $sec^{-1}$.

In these experiments, the same relative proportions of the reactants of Example 3 were used. The sodium aluminate solution was injected into the solution just below the turbine blades.

In the Example 6, the temperature of the solutions being mixed was 12°-3° C., and the mixing was done at 1200 rpm which gives a calculated velocity gradient of 10,752 $sec^{-1}$. After mixing, the product solution was heated to 68° C. and then cooled. The product solution had a satisfactory clarity; no solids were visible. The solution had no precipitated at the end of 4 days and gave flocculating properties equivalent to that of the material produced in Example 3.

In the Example 7, the temperatures of the solutions being mixed were decreased to 5° C., and the mixing was done at 450 rpm, which gave a calculated velocity gradient of 4032 $sec^{-1}$. After mixing, the product was heated to 68° C. and then cooled. The solution had a satisfactory clarity and no solids were visible. The solution had not precipitated at the end of 4 days and gave flocculating properties equivalent to that of the material produced in Example 3.

These experiments showed that a velocity gradient as low as 4032 $sec^{-1}$, Example 7, gave products that were equivalent to those prepared at velocity gradients of 199,200 and 10,752 sec$^{-1}$, Examples 3 and 6 respectively. Furthermore, mixing at temperatures colder than ambient, i.e. at 5° C., can compensate for the lower velocity gradient used. A velocity gradient as low as 1000 sec$^{-1}$ is feasible, but for ease of maintaining the speed of the mixer or homogenizer, velocity gradients of 3000 sec$^{-1}$ or greater, are preferred.

Evidence of silicate incorporation in the polymer

An important aspect of the present invention is the fact that the silicate species are bonded into the polymers. We show three separate methods in which this is substantiated.

1) Physical evidence.

It was found that the addition of silicate to Alum before the product is formed (as in the above examples) yields a clear filterable product, while the addition of silicate under identical conditions, to the already made basic Alum polymer yields a turbid non filterable mixture containing silica gel.

2) Procedure for evaluation of silicon content in "floc".

A—Hydrolysis of polymeric aluminum silicate-sulphate

To 1 liter of tap water at 20.C (pH adjusted to 7.5 with NaOH), 10 ml of the polymeric aluminum silicate-sulphate (or polymeric aluminum sulphate) concentrate was added under stirring at 200 RPM. Stirring was continued for one minute during which a massive floc was formed; the latter was allowed to settle for 15 minutes and filtered on a 1 μm Millipore Filter. The filter cake was recovered and dried under vacuum at 150° C. overnight.

B—Analysis of silicon content

Analysis of the Si content in the dried floc cake was performed by X-ray fluorescence at K line of Si using a KEVEX spectrometer.

The standard used for calibration purposes was a powdered mixture containing Alum (99 wt %) and sodium metasilicate (1%).

The resulting Al/Si ratios were found:
for polymeric aluminum sulphate (no silica included) 1.0:0.009
for polymeric aluminum silicate-sulphate (product with silica) 1.0:0.10
(The silica content found with polymeric aluminum sulphate is due to traces of silica in the Alum and silicate ions in the tap water.)

3) Evidence of silicate incorporation in the polymeric aluminum sulphate compounds (polymeric aluminum silicate-sulphate).

To demonstrate that the silicate species added is process to the polymeric aluminum sulphate compounds to produce polymeric aluminum silicate-sulphate were incorporated into the polymer, rather than dispersed in solution or adsorbed onto the polymers, the following experiments were performed as described below.

The purpose of these experiments was to evaluate the apparent charge (Zeta potential) of the floc resulting from hydrolysis of the dilute polymeric aluminum silicate-sulphate, and polymeric aluminum sulphate compounds.

The following systems were examined:
A—polymeric aluminum silicate-sulphate with silicate added "in process"
B—polymeric aluminum sulphate without silicate
C—polymeric aluminum sulphate with silicate added to the dilute floc at the same Al/Si ratio as in "A" above.

The procedure followed may be summarized as:
A—A polymeric aluminum silicate-sulphate with silicate having the composition given in Example 2 was prepared and an aliquot was diluted (0.20 mL in 1000 mL) to form a floc under rapid stirring (300 rpm). After one minute stirring, a sample was transferred into a zeta potential measuring device (Malvern Zetasizer) to determine the magnitude of zeta potential of the floc and its variation with time over a period of 20-30 minutes.

B—The procedure in 'A' above was repeated with a sample of a polymeric aluminum sulphate prepared as in 'A', without silicate.

C—The experiment described in 'B' above (polymeric aluminum sulphate without silicate) was repeated and the silicate was added immediately after the dilution step, before the floc started to form.

The following observations were noted:
1. Within one minute, the zeta potential readings were stable and remained virtually constant over a period of 30 minutes.
2. Zeta potential values obtained were:
   a) polymeric aluminum silicate-sulphate with silicate incorporated 'in-process' 12 mV (positive)
   b) polymeric aluminum sulphate without silicate 11 mV (positive)
   c) polymeric aluminum sulphate with silicate added after dilution −1 mV (negative).

The Zeta potential results conclusivity shows that adding the silicate species in a dilute solution of a polymeric aluminum sulphate compound leads to a floc with zero or slightly negative Zeta potential. This is radically different from the situation where the silicate is added 'in-process' leading to a positively charged floc (+12 mV).

Also, the polymeric aluminum silicate-sulphate compound prepared with the silicate added 'in-process' lead to floc with a Zeta potential almost identical to that formed with a polymeric aluminum sulphate (without silicate) compound. This observation confirms that the silicate species must be imbedded into the polymeric aluminum species.

Performance test 1

The PASS compound prepared according to Example 2 was tested against Alum in warm and cold water samples taken from the Ottawa river. A first series of samples were cooled to 8° C. and tested using between 3 and 8 ppm $Al_2O_3$ of Alum and the product of Example 2. Results are shown in Tables I and II.

TABLE I

| NAME OF PRODUCT | ALUM |
|---|---|
| Al Conc'n, Equivalent $Al_2O_3$ % | 8.3 |
| Specific gravity | 1.34 |
| RAW WATER: | |
| Source of raw water | Ottawa River |
| pH | 7.2 |
| Alkalinity mg/L $CaCO_3$ | 24 |
| Turbidity (NTU) | 3.7 |
| Temp. at beginning | 8° C. |
| Temp. at the end | 8° C. |
| PROCEDURE | |
| Mixing at 100 rpm (Min.) | 3 |
| Mixing at 25 rpm (Min.) | 15 |
| Mixing at 15 rpm (Min.) | 10 |
| Settling (Min.) | 10 |

TABLE I-continued

| Beaker no. | 1 | 2 | 3 | 4 | 5 | 6 |
|---|---|---|---|---|---|---|
| (μL) | 27 | 36 | 45 | 54 | 63 | 72 |
| $Al_2O_3$ ppm | 3 | 4 | 5 | 6 | 7 | 8 |
| First Appearance of Pin Floc (Min.) | 3 | 3 | 2.8 | 2.5 | 2.5 | 2.1 |
| Size at 7 min. | 1** | 1 | 1.5 | 1.5 | 1.5 | 1.5 |
| Size at 15 min. | 1.5 | 1.5 | 2 | 2 | 2 | 2 |
| Size at 25 min. | 1.5 | 1.5 | 2 | 2 | 2 | 2 |
| Position at 20-25 min. | D | D | D | D | D | D |
| Additional Information | | | | | | |
| pH | 6.56 | 6.48 | 6.27 | 6.08 | 5.75 | 5.41 |
| Alkalinity mg/L $CaCO_3$ | 17 | 16 | 13 | 9 | 8 | 6 |
| Turbidity (NTU) | 3 | 2.9 | 2.3 | 2.4 | 3.8 | 4.2 |

D = Dispersed, C = Centered.
**Floc Sizes (mm)
0 = 0.03-0.5      3 = 1.0-1.5
1 = 0.5-0.75     4 = 1.5-2.25
2 = 0.75-1.0

TABLE II

| PRODUCT | PASS (Example 2) |
|---|---|
| Al Conc'n, Equivalent $Al_2O_3$ % | 7.5 |
| Specific gravity | 1.207 |
| RAW WATER: | |
| Source of raw water | Ottawa River |
| pH | 7.2 |
| Alkalinity mg/L $CaCO_3$ | 24 |
| Turbidity (NTU) | 3.7 |
| Temp. at beginning | 8° C. |
| Temp. at the end | 9° C. |
| PROCEDURE | |
| Mixing at 100 rpm (Min.) | 3 |
| Mixing at 25 rpm (Min.) | 15 |
| Mixing at 15 rpm (Min.) | 10 |
| Settling (Min.) | 10 |

| Beaker no. | 1 | 2 | 3 | 4 | 5 | 6 |
|---|---|---|---|---|---|---|
| (μL) | 33 | 44 | 55 | 66 | 77 | 88 |
| $Al_2O_3$ ppm | 3 | 4 | 5 | 6 | 7 | 8 |
| First Appearance of Pin Floc (Min.) | 10 | 2.6 | 1.5 | 1.1 | 1 | 1 |
| Size at 7 min. | 0 | 1.5 | 1.5 | 2 | 2 | 2 |
| Size at 15 min. | 0 | 2 | 2 | 2.5 | 2.5 | 2 |
| Size at 25 min. | 0 | 2 | 2 | 2.5 | 2.5 | 2.5 |
| Position at 20-25 min. | D | D | D | D | D | D |
| pH | 7 | 6.93 | 6.84 | 6.75 | 6.7 | 6.65 |
| Alkalinity mg/L $CaCO_3$ | 22 | 21 | 18 | 17 | 16 | 14 |
| Turbidity (NTU) | 5 | 1.3 | 0.8 | 0.68 | 0.51 | 0.53 |

D = Dispersed, C = Centered.

As it can be seen, the use of the product of Example 2 represents a remarkable improvement over Alum, especially in cold water with initially high turbidity and low alkalinity. The results also show that Alum does not work effectively at the lowest turbidity of 2.3 NTU at 5 ppm $Al_2O_3$. In these conditions, the results obtained with the product of the present invention are well above acceptable levels. The product of Example 2 shows a turbidity of 0.8 NTU at 5 ppm $Al_2O_3$ and the turbidity continues to decrease to 0.51 NTU as the dosage of $Al_2O_3$ is increased to 7 ppm.

A typical problem with Alum in treatment of cold, low alkalinity water is the incomplete hydrolysis of aluminum sulphate to aluminum hydroxide, thereby requiring high dosages. Alum will often enter into the drinking water system as soluble aluminum sulphate. Therefore, an activated silica treatment as used commonly with Alum in order to compensate for its slower rate of hydrolysis may be reduced or completely eliminated. In the case of the product of Example 2, silica is already contained in the polymer and its rate of hydrolysis and floc size will be quite sufficient to prevent soluble aluminum compounds from entering the treated drinking water supply.

Performance test 2

A second series of tests was performed using St. Lawrence River water at a temperature of 25° C. and tested using between 3 and 8 ppm of $Al_2O_3$ of Alum and the PASS compound of Example 2. Results are summarized in Table III and IV.

TABLE III

| PRODUCT | ALUM |
|---|---|
| Al Conc'n, Equivalent $Al_2O_3$ % | 8.3 |
| Specific gravity | 1.34 |
| RAW WATER: | |
| Source of raw water | St. Lawrence River |
| pH | 7.76 |
| Alkalinity mg/L $CaCO_3$ | 50 |
| Turbidity (NTU) | 2 |
| Colour | 15 |
| Temp. at beginning | 25° C. |
| Temp. at the end | 25° C. |
| PROCEDURE | |
| Mixing at 100 rpm (Min.) | 3 |
| Mixing at 25 rpm (Min.) | 15 |
| Mixing at 15 rpm (Min.) | 10 |
| Settling (Min.) | 10 |

| Beaker no. | 1 | 2 | 3 | 4 | 5 | 6 |
|---|---|---|---|---|---|---|
| Al Conc'n, Equivalent $Al_2O_3$ ppm | 3 | 4 | 5 | 6 | 7 | 8 |
| First Appearance of Pin Floc (Min.) | 3 | 3 | 3 | 3 | 2.3 | 2.1 |
| Size at 7 min. | 1 | 1 | 1.5 | 1.5 | 1.5 | 1.5 |
| Size at 15 min. | 1.5 | 1.5 | 2 | 2 | 2 | 2 |
| Size at 25 min. | 1.5 | 1.5 | 2 | 2 | 2 | 2 |
| Position at 20-25 min. | D | D | D | D | D | D |
| Additional Information | | | | | | |
| pH | 7.23 | 7.14 | 7.09 | 6.9 | 6.81 | 6.67 |
| Alkalinity mg/L $CaCO_3$ | 42 | 38 | 35 | 32 | 30 | 27 |
| Turbidity (NTU) | 0.46 | 0.39 | 0.29 | 0.2 | 0.21 | 0.18 |

D = Dispersed, C = Centered.

TABLE IV

| PRODUCT | PASS (Example 2) |
|---|---|
| Al Conc'n, Equivalent $Al_2O_3$ % | 7.5 |
| Specific gravity | 1.207 |
| RAW WATER: | |
| Source of raw water | St. Lawrence River |
| pH | 7.76 |
| Alkalinity mg/L $CaCO_3$ | 50 |
| Turbidity (NTU) | 2 |
| Temp. at beginning | 25° C. |
| Temp. at the end | 25° C. |
| PROCEDURE | |
| Mixing at 100 rpm (Min.) | 3 |
| Mixing at 25 rpm (Min.) | 15 |
| Mixing at 15 rpm (Min.) | 10 |
| Settling (Min.) | 10 |

| Beaker no. | 1 | 2 | 3 | 4 | 5 | 6 |
|---|---|---|---|---|---|---|
| Al Conc'n Equivalent $Al_2O_3$ ppm | 3 | 4 | 5 | 6 | 7 | 8 |
| First Appearance of Pin Floc (Min.) | 10 | 6 | 3 | 1.6 | 1.3 | 1.1 |
| Size at 7 min. | 0 | 1 | 1.5 | 2 | 2 | 2 |
| Size at 15 min. | 0 | 1 | 2 | 2.5 | 2.5 | 2.5 |
| Size at 25 min. | 0 | 2.5 | 4 | 4 | 4 | 4 |
| Position at 20-25 min. | D | D | CD | CD | CD | CD |
| pH | 7.38 | 7.34 | 7.28 | 7.22 | 7.2 | 7.14 |
| Alkalinity mg/L $CaCO_3$ | 44 | 43 | 42 | 40 | 39 | 38 |
| Turbidity (NTU) | 3.6 | 1.3 | 0.89 | 0.56 | 0.44 | 0.28 |

D = Dispersed, C = Centered.

It can be seen that Alum is somewhat more effective than the PASS product of Example 2 in terms of final turbidity readings for given dosages of $Al_2O_3$. The final turbidity readings are lower because of the fact that the water to be treated is more alkaline (50 mg/L CaCO$_3$) and this favors a more rapid hydrolysis of Alum. However, it is possible to overcome these differences by reducing the basicity of the PASS product of Example 2 to a value between 40 and 45%.

Performance test 3

The compound prepared according to Example 2 was tested against Alum in warm and cold water taken from the Alderbourne River, Buckinghamshire, UK. Coagulation tests of this water were conducted at ambient temperature (about 15° C.) and at 5° C. The Alum contained the equivalent of 8% Al$_2$O$_3$, and was supplied by the Alumina Company, Ltd., Widnes (UK).

A stock solution of the alum was prepared each day at a concentration of 1000 mg/L of equivalent Al. The PASS was also diluted to the same equivalent concentration of Al immediately before use.

The raw water had the following characteristics:
Hardness—230 mg/l CaCO$_3$
Alkalinity—150 mg/l CaCO$_3$
pH—6.9
Turbidity—5.9 ntu
Colour—20° H
Aluminum—30 µg/l
Iron—90 µg/l The water was hard, low in turbidity but significantly coloured. The water was used within 24 hours of taking the samples.

Jar tests were carried out as follows:

1 liter of raw water was placed in tall form beakers. The water stirred rapidly at 200 rpm and the required aliquot of stock solution was added. After one minute, the stirring was switched to 20 rpm and floc sizes noted against a chart initially and at five minute intervals. After 15 minutes stirring ceased, and the beakers' contents were allowed to settle for 15 minutes. At the end of this period about 200 cm$^3$ of the supernatant liquid was decanted, some of which was filtered through a Whatman GF/C grade microfibre filter. The following measurements on the unfiltered and filtered water were made:
(a) turbidity, using a nephelometer
(b) colour, using a comparator
(c) pH using a meter
(d) aluminum spectrophotometrically The results are shown below: The dosage of coagulant used was equivalent to 4 mg/L.

| Coagulant Tested | Control None | | Alum | | PASS | |
|---|---|---|---|---|---|---|
| Temperature | 15° C. | 5° C. | 15° C. | 5° C. | 15° C. | 5° C. |
| Turbidity NTU | | | | | | |
| Non Filtered | 5.9 | 6.8 | 3.6 | 4.4 | 2.3 | 2.2 |
| Filtered | 1.6 | .70 | .47 | .75 | .52 | .75 |
| Colour °H | | | | | | |
| Non Filtered | 20 | | 5 | 10 | 5 | 5 |
| Filtered | 10 | | | .5 | | |
| pH | 6.9 | | | 5.8 | | 6.3 |
| Residual Al µg/l | | | | | | |
| Unfiltered | 30 | | 500 | | 500 | 330 |
| Filtered | | | 100 | 110 | 80 | 30 |
| Floc Size | | | | | | |
| @ 5 min | | | A* | A | B | B |
| @ 10 min | | | B | B | B | C |
| @ 15 min | | | B | C | C | D |

*Floc

| Coagulant Tested | Control None | Alum | PASS |
|---|---|---|---|
| Sizes (mm) | | | |
| A = 0.03–0.5 | | | |
| B = 0.5–0.75 | | | |
| C = 0.75–1.0 | | | |
| D = 1.0–1.5 | | | |
| E = 1.5–2.25 | | | |

In these tests, using a 4 mg/L equivalent Al concentration, PASS give:
lower turbidities than alum on unfiltered water, and equivalent turbidities on filtered water;
lower or equivalent colour to alum;
the European Community (EC) maximum admissible concentration for residual Al is 100 µg/L; PASS gives significantly lower residual Al than alum in filtered water, well below the EC maximum allowed.

Performance test 4

Use of Pass in the Treatment of "White Water"

The product can be advantageously used to replace Alum in the treatment of "white water" effluent from paper mills. White water is essentially the liquid phase of the suspension or paper making furnish applied to the felt or screen of a paper making machine. Typically, this effluent contains 2.5 to 2.8% wood fibres, less than 1% rosin, along with suspended bentonite, and small amounts of sodium sulphite and water soluble polyacrylamide.

Before white water can be disposed of in an environmentally acceptable manner it must be treated to remove the bulk of the suspended and coloured materials. Usually, Alum is used to flocculate and coagulate the suspended material. The product of this invention, PASS, can be used to replace Alum. With PASS, the rate of settling of the suspended material, and the clarity of the supernatant liquid is superior to that obtained with Alum.

EXAMPLE

The tests A to D were carried out at a temperature of 20° C. on a white water of the composition given above. Four different concentrations of PASS were used, corresponding to equivalent Al$_2$O$_3$ concentrations of 83, 166, and 249 ppm, and compared with an Alum at an equivalent concentration of 166 ppm of Al$_2$O$_3$. The tests were carried out in 1L graduated glass cylinders. The water was stirred at a high rate of speed for 10 minutes, the designated dose of flocculant was added and the high speed stirring continued for 3 minutes. Agitation at 20 rpm was done for 10 minutes, followed by 10 minutes of agitation at 10 rpm, after which the suspension was allowed to settle. The settling rate, the settled solids and the clarity of the liquid were observed. The results are summarized below:

| TEST | A | B | C | D |
|---|---|---|---|---|
| Flocculant Type | PASS | PASS | PASS | ALUM |
| Dosage Equiv. Al$_2$O$_3$ | 83 | 166 | 249 | 166 |
| Appearance of Floc During Stirring At 10 rpm | Small | Small | Small | Slightly Larger |
| Settling | Rapid | Rapid | Rapid | Slower |

| TEST | A | B | C | D |
|---|---|---|---|---|
| Rate | | | | |
| Settled Solids After 15 Minutes | Dense | Dense | Dense | Voluminous |
| Settled Solids After 2 Hours | Dense | Dense | Dense | Voluminous |
| Supernatant Water After 2 Hours | Colourless Clear | Colourless Clear | Colourless Clear | Coloured Non-Transparent |

These tests showed that the Alum gave a larger floc than PASS during the initial stirring, but that during the settling, PASS gave a larger volume of supernatant clear liquid, and a denser settled solids. At the end of two hours test period, the PASS treated suspension gave a clear, transparent water, while Alum gave a more deeply coloured and non transparent water. A smaller dosage of PASS, expressed in terms of equivalent $Al_2O_3$, than of Alum is required to obtain a settled solids and supernatant water of acceptable quality.

Performance test 5

Use of Pass in Papermaking

The product (PASS) can advantageously be used to replace papermakers Alum, (aluminum sulphate), to retain the acid sized papermaking furnish or suspension by coagulation and/or flocculation. The papermaking furnish consists of a mixture of softwood and hardwood fibres, clay filler, rosin size, and optionally a retention aid such as a cationic polyacrylamide. Tests have demonstrated that the use of PASS instead of Alum improved the single pass retention rate by 10% over the base rate, and by 5% over that observed with Alum.

The example below describes the laboratory experiment that was carried out to confirm these findings.

EXAMPLE

The suspension environment and mixing or shear conditions prevalent on a paper making machine can be simulated in the laboratory using the Dynamic Drainage Jar (DDJ).

A basic pulp furnish was prepared from a 70:30 mixture of hardwood (Portucel) and softwood (Stora) which was pulped and beaten to 33° Schopper Reigler in a laboratory-scale Valley Beater (H. E. Messmer Ltd.).

The basic furnish contained Grade C china clay (English China Clays) at 10% addition on fibre and emulsified rosin size at 0.6% solids addition on fibre as received. Alum was added at 1% (as $Al_2[SO_4]_3.18H_2O$) and PASS at 0.05% and 0.5% as received on fibre. (The $Al_2O_3$ content of PASS is 8%, compared to about 15% for alum.) Experiments were carried out at stock pH 4 and 5. The pH was adjusted using sodium hydroxide and/or sulphuric acid. The total dry solids in 500 mL DDJ volume were 5.0 g.

The DDJ was fitted with a standard 125 p screen (200 mesh [70 μm]). The furnish was mixed at two DDJ stirrer speeds of 750 rpm and 1500 rpm to impart low and high rates of shear.

A 100 mL sample of the stock passing through the DDJ screen under constant agitation was collected and its solids content estimated after drying to constant weight at 100.C. The DDJ retention was then calculated as follows:

$$SPR\ (\%) = \frac{\text{Stock Consistency (g l}^{-1}) - \text{Filtrate Consistency (g l}^{-1})}{\text{Stock Consistency (g l}^{-1})}$$

The single pass retentions (SPR) of the base furnish alone, without any chemical addition and at natural pH were 84.0% and 83.0% at stirrer speeds of 750 and 1500 rpm respectively. In all cases, the addition of PASS improved SPR over the base retention and over that achieved using alum.

The SPRs at the lower stirrer speed (Table 1) were somewhat higher than those obtained at the faster speed (Table 2). SPRs at both PASS does applications were similar in magnitude. The increase in stirrer speed has a greater effect on the SPR value of alum than for PASS. This indicates that the coagulation and flocs formed by the action of PASS are not only greater in degree (either number or size), but they are relatively more shear stable than those formed by the action of alum. Results were similar for both pHs.

The cationic retention aid (Percol 292) improved the SPR in the presence of both alum and PASS (Table 3).

TABLE 1

SPR As A Function Of Chemical Dose At pH 4.0 And 5.0 And Stirrer Speed Of 750 rpm

| Chemical | Dose (% $Al_2O_3$) | SPR (%) pH 4 | SPR (%) pH 5 |
|---|---|---|---|
| Alum | 1.0 | 87.8 | 88.8 |
| PASS | 0.05 | 93.7 | 92.2 |
| PASS | 0.5 | 93.2 | 95.4 |

TABLE 2

SPR As A Function Of Chemical Dose At pH 4 And 5 And Stirrer Speed Of 1500 rpm

| Chemical | Dose (% $Al_2O_3$) | SPR (%) pH 4 | SPR (%) pH 5 |
|---|---|---|---|
| Alum | 1.0 | 83.8 | 86.0 |
| PASS | 0.05 | 90.8 | 92.2 |
| PASS | 0.5 | 93.5 | 92.4 |

TABLE 3

SPR As A Function Of Chemical Dose And Retention Aid (0.02%) At pH Of 4 and 5 And Stirrer Speed Of 750 rpm

| Chemical | Dose (% $Al_2O_3$) | SPR (%) pH 4 | SPR (%) pH 5 |
|---|---|---|---|
| Alum | 1.0 | 90.3 | 90.8 |
| PASS | 0.05 | 95.7 | 94.2 |
| PASS | 0.5 | 94.9 | 95.0 |

4. CONCLUSIONS

PASS significantly improved the SPR of a simulated acid sizing furnish. The SPR was considerably higher for PASS at lower Al-equivalent doses.

SPR was similar for additions of 0.05 and 0.5% of PASS at both pH 4 and 5.

Although increase in shear level adversely affected retention, the coagulation and flocculation resulting from the use of PASS was found to be more shear resistant than for alum.

A cationic retention aid improved the SPR when used in conjunction with alum and PASS. The retention using PASS was higher than using alum.

What we claim is:

1. An aqueous solution comprising a basic polynucleate aluminum hydroxy silicate-sulphate compound having a composition of the formula:

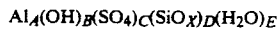

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
X is greater than 2.0 but less than or equal to 4.0 such that $3 = B + 2C + 2D(X-2)$; and
E is larger than 4; said solution having a basicity defined by $B/3A \times 100$ of 25–66%, and wherein said solution also contains up to 10 molar % based on the Al, of water soluble compounds of at least one multivalent cation selected from the group consisting of iron, magnesium, calcium, zinc and zirconium; and wherein said solution contains up to 10 molar %, based on the sulphate anions of water soluble compounds of at least one additional anion selected from the group consisting of phosphate, acetate, borate, chloride and carbonate.

2. A solution according to claim 1, wherein
B = 1.2–1.8
C = 0.53–0.90
D = 0.033–0.070
X is greater than 2.0 but less than or equal to 3.0.

3. A solution according to claim 1, wherein
B = 1.5
C = 0.735
D = 0.050
E = 2.311.

4. A solution according to claim 1, wherein said basic polynucleate aluminum hydroxy silicate-sulphate solution is 7–10 wt. % in $Al_2O_3$.

5. A solution according to claim 1, wherein said basicity is 40–60%.

6. A process for preparing an aqueous solution comprising a basic polynucleate aluminum hydroxy silicate sulphate compound having a composition of the formula:

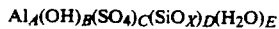

$$Al_A(OH)_B(SO_4)_C(SiO_X)_D(H_2O)_E$$

wherein
A is 1.0;
B ranges from 0.75 to 2.0;
C ranges from 0.30 to 1.12;
D ranges from 0.005 to 0.1;
E is larger than 4; said solution having a basicity defined by $B/3A \times 100$ of 25–66%; and wherein said solution also contains up to 10 molar % based on the Al, of water soluble compounds of at least one multivalent cation selected from the group consisting of iron, magnesium, calcium, zinc and zirconium; and wherein said solution contains up to 10 molar %, based on the sulphate anions of water soluble compounds of at least one additional anion selected from the group consisting of phosphate, acetate, borate, chloride and carbonate;

which process comprises the step of mixing an alkali metal silicate solution with an aluminum sulphate solution at a temperature ranging from 10° to 35° C. and subsequently adding a solution of an alkali metal aluminate to the mixture at a temperature ranging from 10° to 35° C. under high shear mixing conditions; wherein the process further comprises a digestion period at a temperature ranging from ambient to 90° C. to produce a substantially clear solution; and wherein one or more of said alkali metal silicate, said aluminum sulphate and said sodium aluminate contains said multivalent cation and/or said additional anion.

7. A process according to claim 6, wherein the alkali metal silicate is sodium silicate and wherein the alkali aluminate is sodium aluminate.

8. A process according to claim 6, wherein said basicity is 40–60%.

9. A process according to claim 6, wherein said basic polynucleate aluminum hydroxy silicate sulphate solution is 7–10 wt. % in $Al_2O_3$.

10. A process according to claim 6 wherein said high shear mixing conditions produce a velocity gradient exceeding 1000 $sec^{-1}$.

11. A process according to claim 6, claim 7, claim 8, or claim 10 wherein said solution of an alkali metal aluminate is a stabilized solution prepared by reacting an alkali metal aluminate with a monomeric or oligomeric surfactant containing groups capable of bonding chemically with said aluminate but of being displaced during said mixing with said aluminum sulphate solution and said alkali metal silicate solution to permit the formation of said basic polynucleate aluminum hydroxy silicate-sulphate compound.

12. A method of flocculating/coagulating/precipitating suspended or dissolved solids in an aqueous system, comprising the steps of:
adding the basic polynucleate aluminum hydroxy silicate-sulphate solution of claim 1 to said aqueous system, and
flocculating/coagulating/precipitating said solids.

13. The use of a basic polynucleate aluminum silicate-sulphate solution according to claim 1 in a process for purifying water.

14. The use according to claim 13 wherein said water is white water effluent from paper mills.

15. The use of a basic polynucleate aluminum silicate-sulphate solution according to claim 1 in a process for dewatering plant materials.

16. The use according to claim 15 wherein said plant material is leached beet pulp.

17. The use of a basic polynucleate aluminum silicate-sulphate solution according to claim 1 in a process for papermaking.

18. The use according to claim 17 wherein said solution is used to retain an acid sized papermaking furnish by coagulation and/or flocculation.

* * * * *